United States Patent
Chung et al.

(10) Patent No.: US 10,090,564 B2
(45) Date of Patent: Oct. 2, 2018

(54) HIGH AMPERAGE BATTERIES WITH DISPLACEMENT SALT ELECTRODES

(71) Applicants: Massachusetts Institute of Technology, Cambridge, MA (US); Total Marketing Services, Puteaux (FR)

(72) Inventors: Brice H. V. Chung, Boston, MA (US); Donald R. Sadoway, Cambridge, MA (US)

(73) Assignees: Massachusettes Institute of Technology, Cambridge, MA (US); Total S.A., Courbevoie (FR); Total Energies Nouvelles Activites USA, Courbevoie (FR)

( * ) Notice: Subject to any disclaimer, the term of this patent is extended or adjusted under 35 U.S.C. 154(b) by 237 days.

(21) Appl. No.: 14/208,218

(22) Filed: Mar. 13, 2014

(65) Prior Publication Data
US 2014/0272481 A1    Sep. 18, 2014

Related U.S. Application Data

(60) Provisional application No. 61/781,500, filed on Mar. 14, 2013.

(51) Int. Cl.
*H01M 10/39* (2006.01)
*H01M 2/02* (2006.01)
*H01M 4/38* (2006.01)

(52) U.S. Cl.
CPC ....... *H01M 10/399* (2013.01); *H01M 2/0252* (2013.01); *H01M 2/0277* (2013.01);
(Continued)

(58) Field of Classification Search
CPC ... H01M 2/0252; H01M 2/0277; H01M 10/39
See application file for complete search history.

(56) References Cited

U.S. PATENT DOCUMENTS

| 8,268,471 B2 | 9/2012 | Sadoway et al. |
| 8,323,816 B2 | 12/2012 | Bradwell et al. |

(Continued)

FOREIGN PATENT DOCUMENTS

| JP | 6-504404 | 5/1994 |
| WO | WO 92/13366 | 8/1992 |

OTHER PUBLICATIONS

International Searching Authority, International Search Report—International Application No. PCT/IB2014/000617, dated Oct. 15, 2014, together with the Written Opinion of the International Searching Authority, 18 pages.

(Continued)

*Primary Examiner* — Sarah A. Slifka
*Assistant Examiner* — Brian R Ohara
(74) *Attorney, Agent, or Firm* — Sunstein Kann Murphy & Timbers LLP

(57) ABSTRACT

An electrochemical cell includes a negative electrode comprising a first active metal, a positive electrode comprising a second active metal, and an electrolyte comprising salts of the two active metals, a salt of the cathodic metal and a salt of the anodic metal. In operation, the electrolyte composition varies such that in a charging mode the salt of the anodic salt decreases, while the salt of the cathodic salt increases, and in a discharging mode the salt of the anodic salt increases, while the salt of the cathodic salt decreases. The cell is operational for both storing electrical energy and as a source of electrical energy as part of an uninterruptible power system. The cell is particularly suited to store electrical energy produced by an intermittent renewable energy source.

44 Claims, 9 Drawing Sheets

(52) U.S. Cl.
CPC ........... *H01M 10/39* (2013.01); *H01M 4/38* (2013.01); *H01M 2220/10* (2013.01); *H01M 2300/0048* (2013.01)

(56) References Cited

U.S. PATENT DOCUMENTS

| | | | |
|---|---|---|---|
| 2004/0183500 A1* | 9/2004 | Watanabe | H01M 2/105 320/101 |
| 2008/0081249 A1* | 4/2008 | Kaneko | H01M 2/204 429/121 |
| 2011/0014505 A1* | 1/2011 | Bradwell | H01M 2/0252 429/51 |
| 2012/0104990 A1 | 5/2012 | Boysen et al. | |
| 2014/0099522 A1 | 4/2014 | Spatocco et al. | |
| 2014/0134478 A1* | 5/2014 | Zhao | H01M 10/36 429/199 |
| 2014/0211370 A1* | 7/2014 | Seymour | H01G 11/36 361/504 |

OTHER PUBLICATIONS

Kim, Hojong et al., "Liquid Metal Batteries: Past, Present, and Future," *Chemical Reviews*, vol. 113, No. 3, Mar. 13, 2013, pp. 2075-2099.

Sadoway, Donald R., "Block and graft copolymer electrolytes for high-performance, solid-state, lithium batteries," Journal of Power Sources, Elsevier, vol. 129, No. 1, Apr. 15, 2004, pp. 1-3.

Agruss, B., et al., "The Thermally Regenerative Liquid Metal Concentration Cell," *Advances in Chemistry*, vol. 64, Chapter 7, pp. 62-81, Jan. 1, 1967.

Australian Government IP Australia, Australian Examination Report No. 1 for Standard Patent Application, Application No. 2014229643, 6 pages, dated Jan. 29, 2018.

\* cited by examiner

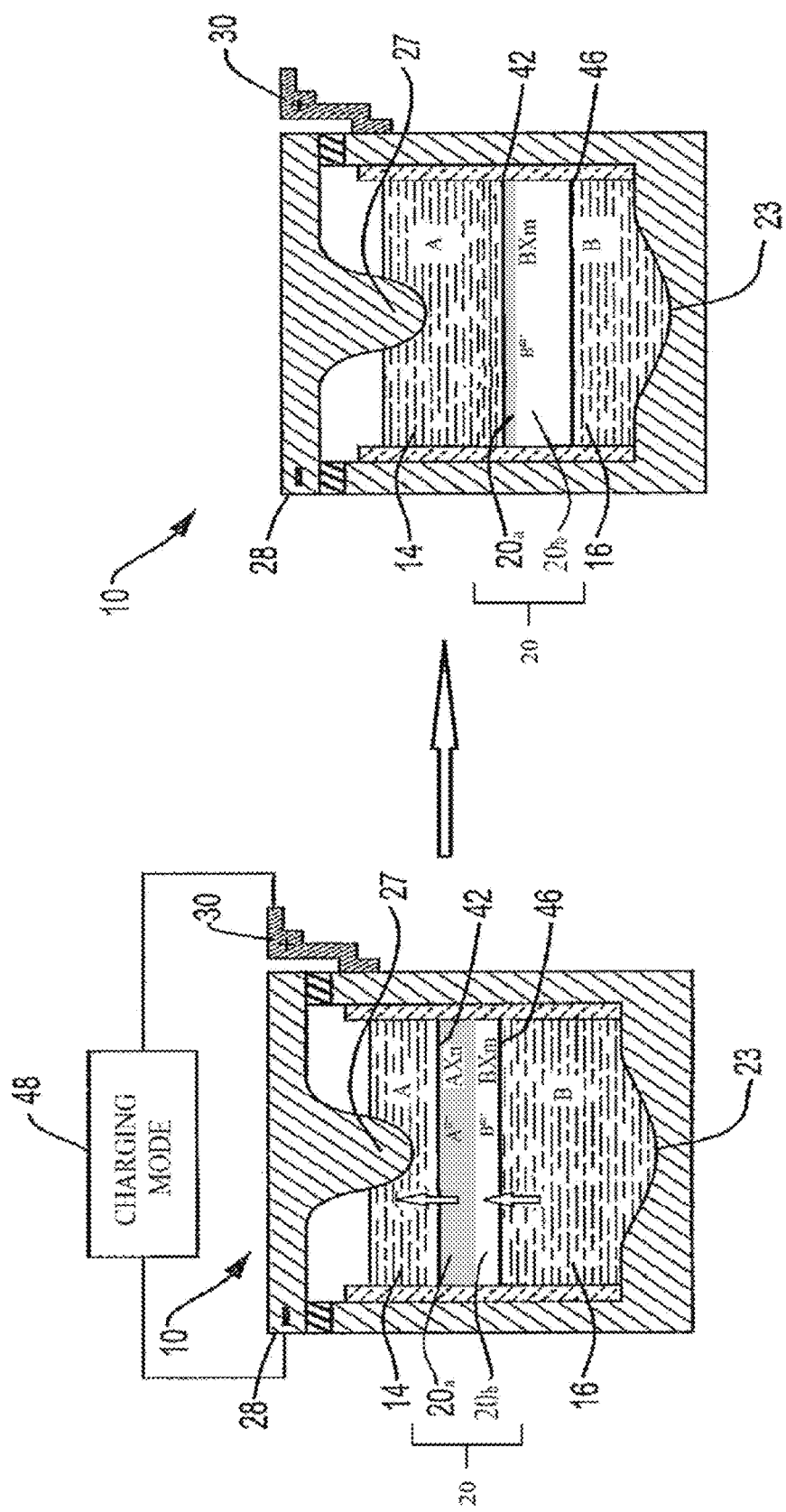

HIGH AMPERAGE BATTERIES WITH DISPLACEMENT SALT ELECTRODES

CROSS-REFERENCE TO RELATED APPLICATIONS

This patent application claims the benefit of U.S. Provisional Patent Application No. 61/781,500 filed Mar. 14, 2013, the disclosure of which is incorporated by reference herein in its entirety.

STATEMENT REGARDING FEDERALLY SPONSORED RESEARCH OR DEVELOPMENT

This invention was made with government support under DE-AR0000047 awarded by ARPA-E. The U.S. government has certain rights in the invention.

TECHNICAL FIELD

The present invention relates to galvanic electrochemical cells for use in dynamic storage of energy, and more particularly to these galvanic cells operating at high currents.

BACKGROUND

Electrical energy generation in the United States relies on a variety of energy sources such as fossil, nuclear, solar, wind and hydroelectric. With the concern of the dwindling supply of fossil fuel, one of the great challenges of energy supply chains is balancing supply with demand. In particular, managing the intrinsic intermittency of renewable sources of energy such as wind or solar is key to enable their adoption at large scale. Part of the problem is the inability to store electrical energy in an efficient and cost effective way. Electrochemical cells using liquid metals in alloying/dealloying reactions have been developed but generally operate at low voltages of about 1 volt or less. Enabling higher voltage cells while retaining the use of low cost materials would significantly decrease the cost of these devices and further improve their efficiency.

SUMMARY OF THE EMBODIMENTS

There is provided galvanic cells using low cost electrodes and electrolytes, the operation of which relies on the electrochemical displacement of salts in the electrolyte from a salt of the anode metal type, to a salt of the cathode metal type or metalloid upon charging, and vice-versa upon discharging. These cells, referred to herein as active metal ion cells or active metal ion energy-storage cells, can be operated with either solid or liquid phases of metal and salt. These cells deliver and store energy at a high voltage and are capable of sustaining high current densities, more than doubling the typical voltage/power expected from previous alloying/de-alloying cells. By accessing higher chemical energy reactions, active metal ion cells can be assembled from a wider array of cost effective metals, metalloids and salts, extending the choice of candidate electrodes, and potentially enabling lower operating temperatures. Additionally, the claimed higher voltages enable a simpler system assembly of a lesser number of unit cells to form batteries adequate for use on the grid and having the same power output as lower voltage alloying/de-alloying based batteries.

In a first embodiment of the invention, there is provided an electrochemical active metal ion cell with two active metals, a first phase having the first active metal, a second phase having the second active metal, a metal or metalloid, and a third phase, between the first and second phases, having a salt of the first active metal and a salt of the second active metal or metalloid. The first phase, defining an anode, has an active metal such as an alkali or alkaline earth metal in its elemental metallic form (e.g Li), or hosted in an alloy phase (e.g. Li—Mg), and is in contact with the third phase at one of its two interfaces. The second phase, defining the cathode, has the other active metal or metalloid in its elemental, metallic form, or an alloy thereof, e.g., antimony and lead Sb—Pb. The second phase is separated from the first phase and is in contact with the third phase at its second of two interfaces. The first, second, and third phases may be solid (in operation if designed so, or during manufacturing or transport or maintenance of the cell), liquid (generally in operation), or in a combination of solid or liquid states. The anodic metal resides at a disparate chemical potential relative to the cathodic salt, causing a voltage between the first and second phases.

In another embodiment, the electrochemical active metal ion cell is in a discharged state and may include a small amount of the salt of the second active metal or metalloid in the electrolyte, such as prior to use.

In some embodiments, the first phase comprises a metal or alloys of any one of the groups IA, IIA, IIIA, IVA, and IIB of the periodic table of the elements. In some embodiments, this metal is selected from lithium, sodium, potassium, barium, calcium, magnesium, strontium, aluminum, silicon and/or zinc.

In some embodiments, the second phase comprises a metal or metalloid of any one of the groups IB, IIB, VIIIB, IIIA, IVA, VA and VIA of the periodic table of the elements. In some embodiments, this metal is selected from iron, nickel, copper, iron, aluminum, silicon, zinc, cadmium, mercury, lead, antimony, bismuth, and/or alloys thereof. In some embodiments, this metal is an alloy of lead and antimony. In other embodiments, the alloy comprises 20 mole % lead in bismuth.

In some embodiments, the electrolyte, or third phase, comprises a halide salt or mixture thereof, such as selected from the group of fluoride, chloride, bromide, and/or iodide. In some embodiments, the electrolyte may further include a salt of the first active metal and the second active metal, which may be selected from one, two, or more salts, such as a halide, sulfate, carbonate and/or nitrate. In some embodiments, the electrolyte may further include a salt of an inactive metal, such as aluminum tetrachloride, magnesium chloride, potassium halides and other combinations of salts. Addition of inactive salts may favorably lower the melting temperature of the third phase and/or introduce miscibility gaps that can induce a phase separation of the third phase to a first layer highly concentrated in the first metal salt and a second layer highly concentrated of the second metal salt In some embodiments, the active metal ion cell is Li|LiBr—PbBr$_2$|Pb (having a potential of 2.1V), Li|PbCl$_2$ (having a potential of about 2.3 V at 500° C.), Li|FeCl$_2$ (having a potential of about 2.3 V), or Li|LiCl—LiF—LiBr—PbCl$_2$|Pb—Sb (having a potential of about 2.48 V at 500° C.). With an appropriate choice of materials, the cells may be operated at low temperatures, such as in the case Na|NiCl$_2$ chemistry, which can be operated at about 250° C.

In some embodiments a separator in a solid or liquid phase may be employed to physically separate the third layer into two phases—a first upper layer containing anodic salt and devoid of cathodic salt, and the second lower layer containing both anodic salt and cathodic salt. The separator would solely allow ionic conduction of the anode ion, or conduction of the anion taking place in the electrochemical displacement reaction while preventing transport of cathodic ion.

In some embodiments the separator can be placed in direct contact with the first phase still allowing for anode ion or active anion conduction and preventing cathode ion transport. In this case the phase separation of the third phase may not be necessary. Such separator may be selected from ionically conductive materials like a $Na^+$ conductive beta alumina or conductive ceramics such as NASICON™ (Merck; $Na_3Zr_2Si_2PO_{12}$, a sodium super-ionic conductor) for Na anode chemistries. LISICON™ (Merck, $Li_4SiO_4$, a solid electrolyte), Li beta alumina or oxide and other sulfide-based glasses, may be used for Li based chemistries. Appropriate conductors may be selected for other anode candidates. When the temperature of operation allows (<300° C.), an ionically conductive polymer such as a block copolymer electrolyte, as described in WO2000/005774, the content of which is incorporated herein by reference, may also be used.

In accordance with other embodiments, a battery includes two or more electrochemical active metal ion cells as described above, electrically connected in series, connected in parallel, and/or connected in series and in parallel.

Among others, the electrochemical system may have a total capacity of less than about 30 kWh. In other embodiments, the electrochemical system may have a total capacity of more than about 30 kWh.

In some embodiments, some of the inner walls of the electrochemical active metal ion cells, in contact with at least the first and second phases, are covered with an insulating material. This material can be ceramic based such as alumina, magnesia, boron nitride, aluminum nitride, etc. This insulating material may also be a polymer stable at temperatures below 300° C. for cells operating at low temperatures. In some embodiments, the insulating material is poly(oxyethylene) methacrylate-g-poly(dimethyl siloxane) (POEM-g-PDMS) (a synthetic insulating polymer that has a high melting temperature).

There is also provided a method to store electrical energy transferred from an external circuit into the electrochemical active metal ion cell as described above. To that end, the method provides at least one electrochemical active metal ion cell having three phases with two active metals, the first phase defining an anode and having the first active metal, the second phase defining a cathode and having the second active metal, a metal or metalloid, and the third phase, between the first and second phases, defines an electrolyte having salts of the first active metal and the second active metal. The electrolyte may include a small amount of the salt of the second active metal or metalloid, where the molar amount of the first active metal is greater than the molar amount of the second active metal or metalloid. The first phase is in contact with the third phase at one of two interfaces of the third phase, and the second phase is in contact with the third phase at its second of two interfaces.

In some embodiments, the method includes an electrochemical active metal ion cell connected to one or more of an electric power plant, a power transmission line, and/or an external circuit that delivers energy converted from a renewable energy source. In some embodiments, the method includes an electrochemical active metal ion cell that is part of a system to provide a continuous or steady power supply.

BRIEF DESCRIPTION OF THE DRAWINGS

The foregoing features of embodiments will be more readily understood by reference to the following detailed description, taken with reference to the accompanying drawings, in which:

In FIG. 1A, the electrolyte represents a single phase and in FIG. 1B, the electrolyte forms two discreet phases.

FIGS. 2A and 2B are vertical cross-sectional views illustrating the charging process of an energy storage electrochemical active metal ion cell according to an embodiment of the invention. FIG. 2A shows when the cell is discharged and FIG. 2B shows when the cell is charged.

FIG. 3A shows when the cell is charged and FIG. 3B shows when the cell is discharged.

DETAILED DESCRIPTION OF SPECIFIC EMBODIMENTS

The new displacement salt reaction systems according to embodiments of the present invention represent a notable departure from previous alloying/dealloying liquid metal electrochemical cells where energy and voltage output are typically low (<1V). In embodiments of the present invention, the stored energy relies on the difference of a thermodynamically unfavorable displacement of an anodic salt $AX_n$ (e.g., LiBr) by a cathodic salt $BX_m$ (e.g., $PbBr_2$) in the electrolyte. An anode metal A, preferably weakly electronegative, tends to form stronger ionic bonds with anions, e.g., like halides. The anode metal may include alloys or elements of the alkali and alkaline earth metals (e.g., Li, Na, Ca, Mg, Sr, Ba, etc.) although stronger electronegative metals, such as Al, Si or Zn, may also be considered as anodes or alloying agent. A cathode metal B may be selected among strongly electronegative metals or metalloids (e.g., Pb, Sb, Bi, Sn, Al, etc.), and transition metals (e.g., Fe, Ni, Cu, Cr, Zn, etc.), which tend to form weaker bonds with anions, e.g., like halides and others.

A salt or mixture of $A^{n+}$ conductive $AX_n$, such as halides or mixture thereof (where X=F, Cl, Br, I), sulfates, nitrates, hydroxides, organic salts (acetate), chlorates, and/or borates, may serve as an ionic conductor for $A^{n+}$ and an anodic reactant reservoir (also referred to as an anolyte). Finally, a cathodic salt, $BX_m$ (also referred to as catholyte), such as halides or mixtures of, sulfates, nitrates, hydroxides, organic salts (acetate), chlorates, and/or borates may serve as a reactant and is produced as the cell is charged and B displaces A in the electrolyte. The composition of anolyte/electrolyte/catholyte includes a proper combination of salts. To avoid or minimize direct reaction of catholyte with the anode one embodiment may use mixtures making use of immiscible phases, for example mixtures having chloroaluminates show liquid/liquid miscibility gaps for a variety of systems. In this case the catholyte would be prevented from mixing with anolyte and self-segregate to the bottom of the cell based on immiscibility.

As used herein, the term "battery" may encompass an individual electrochemical active metal ion cell or cell unit having a positive electrode, a negative electrode, and an electrolyte, as well as configurations having an array of electrochemical cells.

Figure 1A:
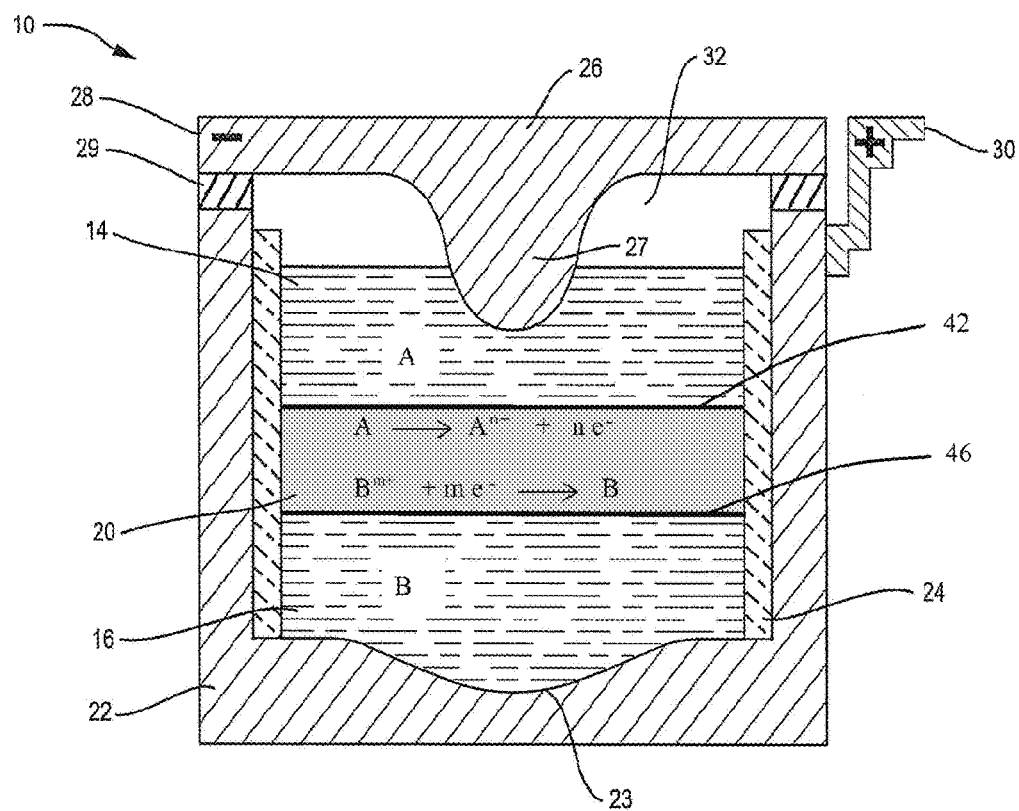
FIGS. 1A and 1B are vertical cross-sectional views showing self-assembling energy storage electrochemical active metal ion cells according to embodiments of the invention.

Referring to FIG. 1A, in general, a device (e.g., an electrochemical cell or battery) has a positive electrode 16 with a metallic or metalloid element B, and a negative electrode 14 having a metal A, such as an alkali metal or alkaline earth metal. These electrodes cooperate to efficiently store and deliver energy across an electrolyte 20. Although these electrodes and the electrolyte preferably are in a liquid phase during operation, in some embodiments, some of the active materials may be in a solid phase (e.g. when B is a transition metal). Active materials may also be in a solid phase such as when not in use or for transport. In other embodiments, the device is in a solid-liquid phase mixture. Details of various embodiments are discussed below.

Figure 1B:
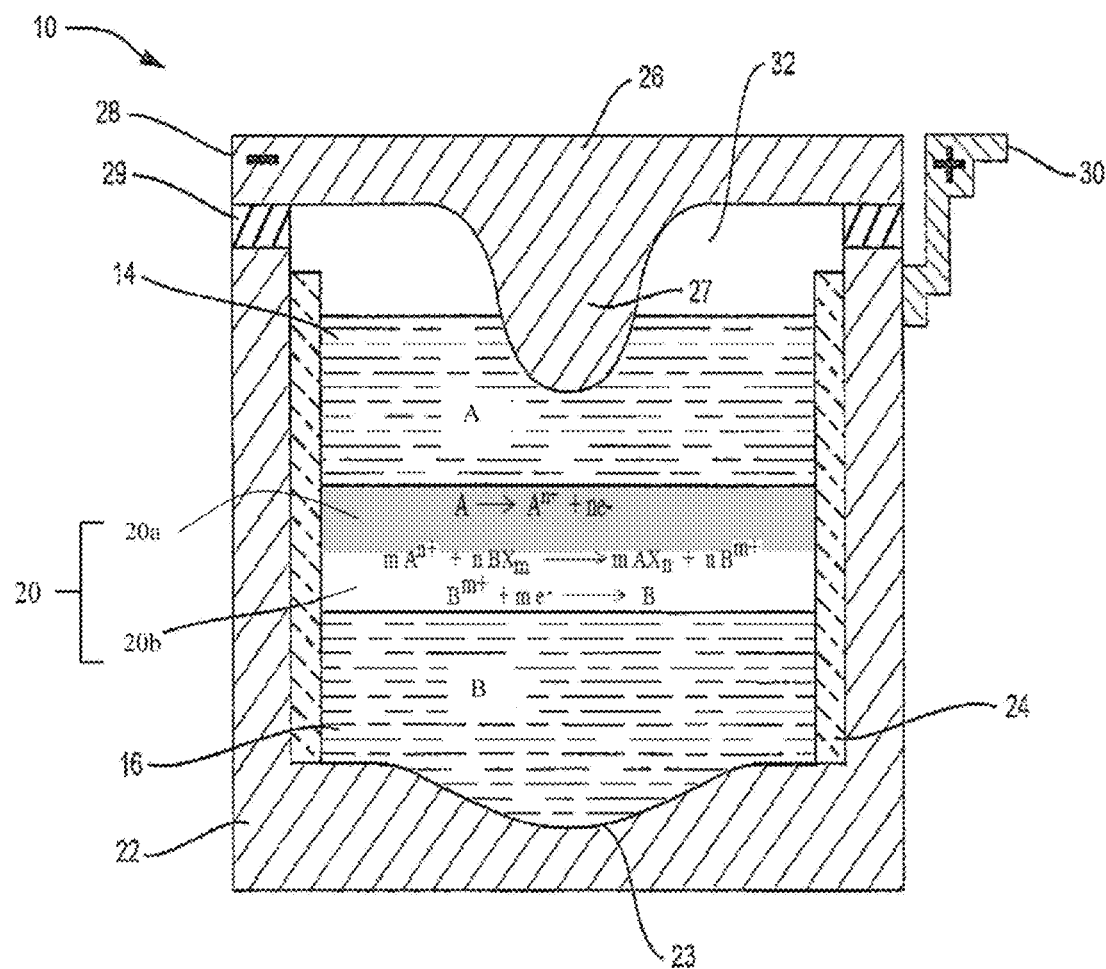

As shown in FIGS. 1A and 1B, the electrochemical cell 10 may include the electronically conductive layers 14, 16 and ionic conductive layer 20 confined in a container 22 that may be electrically conductive and may optionally include an insulating inner sheath 24. The sheath 24 prevents shorting by electric conduction between the negative electrode 14 and the positive electrode 16 through the container 22 when such container is made of a conductive material. The container 22 is covered by a lid 26 which may be electrically conductive. An electrically insulating seal 29 electrically isolates the lid 26 from the container 22 to confine molten constituents and vapors within the container 22. The portion of the lid 26 in contact with the negative electrode 14 functions as a negative current collector 27, through which electrons may pass to an external source or sink (not shown) by way of a negative terminal 28 that is in contact with the lid 26.

The portion of the container 22 in contact with the positive electrode 16 functions as the positive current collector 23, through which electrons may pass to the external source or load by way of a positive terminal 30 connected to the container 22. The negative terminal 28 and the positive terminal 30 are oriented to facilitate arranging individual cell units in series by connecting the negative terminal 28 of one cell unit to the positive terminal 30 of another cell unit 10 to form a battery. The terminals 28 may also be connected to one another, and the terminal 30 also may be connected to one another to arrange the cells in parallel.

The active metal ion cell 10 also may have an inert gas layer 32 overlaying the negative electrode 14 to accommodate global volume changes in the three-phase system produced by 1) charging and discharging, or 2) temperature changes. Optionally, the lid 26 or seal 29 incorporates a safety pressure valve (not shown).

The container 22 and the lid 26 are each formed from materials having the requisite electric conductivity (when so required), mechanical strength, and resistance to chemical attack by the liquid electrodes 14 and 16 and electrolyte 20. Depending on the composition of the electrodes, conventional materials such as mild steel may be a suitable material for the container 22 and the lid 26. The optional sheath 24 may be formed from an electrically insulating material and should be corrosion-resistant against the electrodes 14 and 16 and the electrolyte 20 (optionally with layers 20a and 20b). For example, boron nitride, aluminum nitride, alumina, and/or magnesia are appropriate materials for the optional sheath 24. Because of the possible low operating temperature of the cells described herein, other materials such as high temperature resistant polymers, like poly(oxyethylene) methacrylate-g-poly(dimethyl siloxane) (POEM-g-PDMS) may be advantageously substituted. The same is true for the seal 29 material. Alternatively, the entire container may be made of polymer, except for the current collectors 27, 23 that connect each electrode 14 and 16 to a corresponding positive and negative terminal.

During operation of the active metal ion energy storage cell 10, the ratio of the active metal cations in the electrolyte 20 varies. The composition of the electrolyte changes from one where the first active metal salt $AX_n$ is predominant (discharged state) to a composition where the second active metal salt $BX_m$ is predominant (charged state). Changes in the salt composition of the electrolyte are controlled by the following reactions occurring simultaneously at the electrode-electrolyte interfaces 42 and 46:

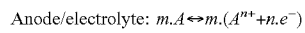

Anode/electrolyte: $m.A \leftrightarrow m.(A^{n+} + n.e^-)$

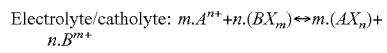

Electrolyte/catholyte: $m.A^{n+} + n.(BX_m) \leftrightarrow m.(AX_n) + n.B^{m+}$

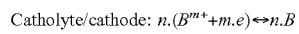

Catholyte/cathode: $n.(B^{m+} + m.e) \leftrightarrow n.B$

Referring to FIG. 1B, separation of the salts $AX_n$ and $BX_m$ of the first and second active metals may advantageously minimize leakage current of the cell, that is, when the second cation $B^+$ directly reacts at interface 42 with metal A and recombines with an electron to regain its metallic form at the anode side. The low solubility of one of the cation in the salt of the other or of a salt of a non-active metal cation, or complete immiscibility induced by careful selection of electrolyte composition, may lead to a desirable gradient or discreet phase separation between the two cations wherein a layer of a salt of the first active metal cations $A^+$ accumulates at the anode|electrolyte interface shown as 20a (also known as an anolyte), while a layer of a salt of the second active metal cations $B^+$ accumulates at the cathode|electrolyte interface shown as 20b (also known as a catholyte). For example, solid salts of the cathode, such as $NiCl_2$ or $FeCl_2$, have limited solubility in a non-active metal salt, such as $AlCl_4$ (which melts at 200-300° C.).

In illustrative embodiments, the electrodes 14 and 16 and electrolyte 20 (optionally with layers 20a and 20b) are constituted to establish chemical and physical properties compatible with simplicity and economy of construction, robustness, and rapid and efficient receipt and delivery of electrical energy. Accordingly, as noted above, the chemical compositions of electrodes 14 and 16 are formulated conjunctionally to incorporate each active metal generating a voltage between the electrodes 14 and 16.

When a molten phase is desired, it is possible to alloy the positive electrode metal to achieve a suitable melting temperature. This can allow the use of metals that have attractive voltages despite their high melting temperatures. For example, a Pb—Bi alloy can be used as its eutectic composition melts at 200° C. Alloying the positive electrode metal may be advantageously used to lower the melting point of the liquid metal alloy (e.g., antimony melts at 631° C., while the lead-antimony eutectic alloy melts at 253° C.). Optimization of the electrode material composition can lead to additional cost savings through further operating temperature reductions.

This, in turn, allows the active metal ion cells to operate at a lower temperature and/or operate more efficiently. Furthermore, a cell operating at a lower temperature should experience less corrosion and potentially extended operating lifespan of the cell. Additionally, a lower operating temperature may enable lower cost secondary materials and assembly such as with the use of polymers.

Numerous factors are important when choosing additional elements for the electrodes 14 and 16. For example, those factors include, among other things, the chemical equilibrium and solution thermodynamics in the electrodes 14 and 16, their interactions with the electrolyte 20, their relative densities, melting points and boiling points.

As noted, the positive electrode 16 may include one or more elements. The positive electrode 16 of binary or higher order composition may have physical properties that allow the active metal ion cell 10 to operate at a lower temperature. Elements that may be appropriate for alloying with the active metal in the positive electrode 16 include elements of Groups IB, IIB, IIIA, VA, VIA, and VIIIA of the periodic table of the elements, such as iron, nickel, copper, iron, aluminum, zinc, cadmium, mercury, lead, antimony and/or bismuth.

The compositions of the electrode 14 and 16 and electrolyte 20 may be formulated so that all-liquid operation may be reached at relatively low temperatures, such as about 500° C. or lower, such as between about 200° C. to 300° C. Difficulties such as volatilization of cell constituents, structural weakness, chemical attack of ancillary materials, and power required to maintain liquidity of the electrodes 14 and 16 and electrolyte 20 become more manageable as operating temperature decreases, reducing the cost of operating the cell 10.

Most widely used electrolytes are metal-halide salt mixtures that have eutectic melting temperatures in excess of 300° C. For systems operating at low temperature, hydroxide based electrolytes are of particular interest for several major reasons. For example, sodium hydroxide salts form deep eutectics with a number of other sodium salts. These include, for example, NaOH—NaBr (260° C.), NaOH—NaI (230° C.), NaOH—NaNO$_3$ (250° C.), NaOH—Na$_2$SO$_4$ (294° C.), and NaOH—Na$_2$CO$_3$ (286° C.). Secondly, molten sodium hydroxide has very high ionic conductivities in the range of 1.0-1.5 S/cm$^2$ which enables high current densities of the systems. Third, pure sodium metal is stable with its own hydroxide molten salt. Pure sodium is also stable with polymer components, like poly(oxyethylene) methacrylate-g-poly(dimethyl siloxane) (POEM-g-PDMS), which become available for use as insulating materials for the cells instead of brittle ceramics.

The electrodes 14 and 16 and the electrolyte 20 may be further formulated so that their densities are ordered in accordance with their functions in the active metal ion cell 10. Various embodiments having respective densities increasing, as shown in FIG. 1A, or decreasing in the order negative electrode 14|electrolyte 20|positive electrode 16 may spontaneously self-assemble into the illustrated vertically stacked, layered structure upon melting, providing for simpler manufacture. In the case where self-assembly is not favorable, than a vertical arrangement of the layer may be assembled in a container having porous vertical walls, or membranes, to separate the layer. Other types of containers are also widely known in the art.

Referring to FIGS. 2A and 2B, the illustrative active metal ion cell 10 receives or delivers energy by transporting active metals, such as the first active metal from the anode into the electrolyte and the second active metal from the electrolyte into the cathode upon discharging, and vice versa upon discharging. The liquid electrolyte 20, comprising cations of both active metals, enables ionic transport of the active metals from the electrodes into the electrolyte, and vice versa.

An illustrative electrochemical active metal ion cell is preferably constructed in a discharged state by first adding the second active metal as the cathode. The electrolyte, a salt of the active anodic metal is then added, or optionally a mixture of the two active metal salts is added with the salt of the first active metal representing the larger amount within the mixture. The negative electrode current collector is then installed, and the cell is heated to the operating temperature inside an argon filled test vessel. A rapid assembly in air may also be possible provided appropriate drying procedures are taken before initial operation.

FIGS. 2A-2B illustrate the function of the active metal ion cell 10 during charging. FIG. 2A shows the cell 10 in an uncharged or discharged state. Before charging, the electrolyte 20 contains cation of the active anodic metal $A^{n+}$ or of both the active metals $A^{n+}$ and $B^{m+}$ (e.g., a molar amount of the cation of the first active metal $A^{n+}$ may be greater than the molar amount of the cation of the second active metal $B^{m+}$). For example, the parts of these cations as expressed by $A^{n+}:B^{m+}$ may initially be from about 1M:1 to about 1:100. The negative electrode 14 meets the electrolyte 20 at an active metal-electrolyte interface 42. In a corresponding manner, the positive electrode 16 meets the electrolyte 20 at a separate active metal-electrolyte interface 46. As shown and discussed below, these interfaces move during charging and discharging. In other words, the positive electrode 16 has a volume that increases or decreases in correlation with a decrease or increase of the volume of the negative electrode 14, respectively.

Specifically, FIG. 2A shows the effect of the charging process on the components of the active metal ion cell 10. To initiate charging, the terminals 28 and 30 are connected to an external charging circuit 48, which drives the active metal salt $A^{n+}$, which is converted into the active metal A at the negative electrode|electrolyte interface 42. The active cations and the electrons meet at the interface 42 and are consumed in the reduction half-cell reaction $A^{n+}+n\ e^-\rightarrow A$. During charging, electron current travels from the external circuit, through the negative current collector 27, into the negative electrode 14, and to the active metal-electrolyte interface 42. The neutral active metal atoms A created in the half-cell reaction accrue to the negative electrode 14. As the active metal A accumulates in the negative electrode 14, the active metal-electrolyte interface 42 moves further away from the negative current collector 27. Meanwhile, the active metal B is driven from the positive electrode 16, into the electrolyte 20, as a cation $B^{m+}$ at the positive electrode-|electrolyte interface 46. At the alloy-electrolyte interface 46, atoms of the active metal B in the positive electrode are oxidized in the half-cell reaction B→B$^{m+}$+m e$^-$. As active cations B$^{m+}$ enter the electrolyte 20, electrons are freed to pass through the positive current collector 23 to the external charging circuit 48. Oxidation of the active metal atoms B shrinks the positive electrode 16, and the electrolyte interface 46 moves toward the positive current collector 23.

FIG. 2B shows the active metal ion cell 10 near its final charged state. Charging has changed the composition of at least the electrolyte 20, by loss of atoms of the first active metal salt A$^{n+}$, and increase of the second active metal salt B$^{m+}$. The thickness of the negative electrode 14 has grown at the expense of the positive electrode 16. The electrolyte layer 20 may have changed in volume due to a difference in density between the first and second active metal salts.

The active metal deposited in the molten active metal electrode 14 represents stored electrical energy which may persist substantially indefinitely, as long as no external electrical path joins the two electrodes 14 and 16 and the recombination of cathodic salt at the anode interface 42 is minimized. The cell is operated at a temperature where the half-cell reactions in the cell 10 preferentially generate liquid-phase products at the electrodes 14, 16 and in the electrolyte 20. Liquid phase electrodes 14, 16 have superior current capability and lifetime expectancy but solid electrodes may also be a viable option. While the electrodes 14 and 16 and electrolyte 20 remain in their liquid state, the active metals and the active cations are available to charge and discharge via an electrochemical pathway. This reversibility renders the active metal ion cell suitable for use in batteries for energy storage.

Figure 3A:
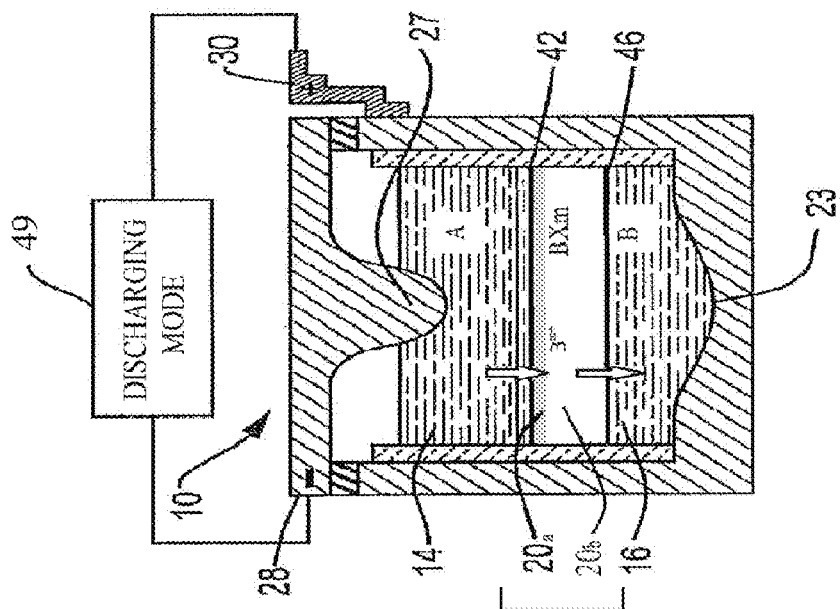
FIGS. 3A and 3B are vertical cross-sectional views illustrating the discharging process of an active metal ion energy storage cell according to an embodiment of the invention.
Figure 3B:
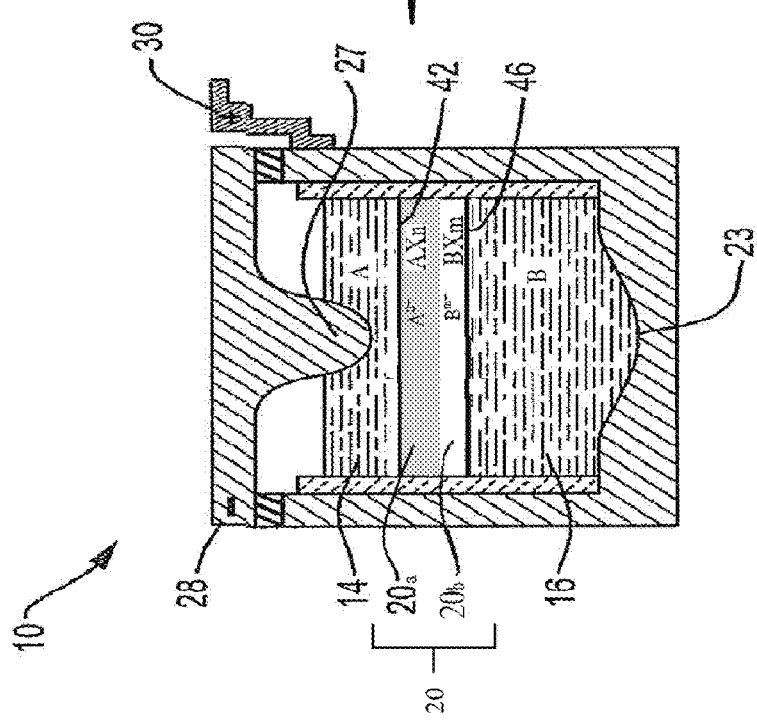

FIGS. 3A-3B illustrate discharging the active metal ion cell 10. FIG. 3A shows the active metal ion cell 10 in a charged state, with the active metal ion cell terminals 28 and 30 connected to an external load 49 (shown in FIG. 3B), which initiates discharge. Before discharging, the electrolyte 20 contains cations of both the active metals A$^{n+}$ and B$^{m+}$ (e.g., a molar amount of the cation of the first active metal A$^{n+}$ being smaller than molar amount of the cation of the second active metal B$^{m+}$. For example, the parts of these cations may initially be from 100% B$^{m+}$ or less. Electron current travels into the cell through the positive current collector 23 to the positive electrode 16, to the positive electrode-electrolyte interface 46. Second active metal cations B$^{m+}$ migrate from the electrolyte 20 toward the interface 46. Active cations B$^{m+}$ and electrons are consumed at the interface 46 in the reduction half-cell reaction B$^{m+}$+ me$^-$→B. Reduction of the active metal ions B$^{m+}$ causes an increase of the positive electrode 16, with movement of the active metal-electrolyte interface 46 away from the positive current collector 23. The neutral active first metal atoms A migrate from the negative electrode into the electrolyte at the negative electrode-electrolyte interface 42 producing the first active metal salt A$^{n+}$ which accrues in the electrolyte 20. As the active metal A$^{n+}$ accumulates in the electrolyte 20, the negative electrode-electrolyte interface 42 moves closer to the negative current collector 27. At the negative electrode-electrolyte interface 42, atoms of the first active metal A in the negative electrode 14 are oxidized in the half-cell reaction A→A$^{n+}$+ne$^-$. The active cations produced enter the electrolyte 20, and the freed electrons pass through the negative current collector 27 to the external load 49.

FIG. 3B shows the active metal ion cell 10 near its final discharged state. Discharging has changed the composition of at least the electrolyte 20 due to increase of first active metal salt AX$_n$ and decrease of the second active metal salt, BX$_m$. The thickness of the positive electrode 16 has grown at the expense of thickness of the negative electrode 14.

The charge and discharge sequences of FIGS. 2A-2B and 3A-3B represent anticipated examples of the active metal ion cell 10 during use. In alternative embodiments, when fully discharged, the entire negative electrode 14 may be completely used—the entire liquid mass making up the negative electrode 14 migrated to the electrolyte 20. In other alternative embodiments, when fully charged, the entire positive electrode 16 may be completely used—the entire liquid mass making up the positive electrode 16 migrated to the electrolyte 20. Moreover, some embodiments may implement the cell 10 with solid phase electrodes 14 and 16, and/or a solid phase electrolyte 20. Solid phase electrodes may be favorable for shipping of the cell 10. Other embodiments may also include an ion-selective separator located at the interface 20 or located in electrolyte 20 to phase separate the B$^{m+}$ rich zone 20b from the anode.

The energy capacity of the active metal ion cell 10 may be limited by the smaller of the respective quantities of first and second active metals in relation to their respective salts. The energy capacity can be augmented by scaling up the quantity of material in the electrodes 14 and 16 and electrolyte 20.

Figure 4A:
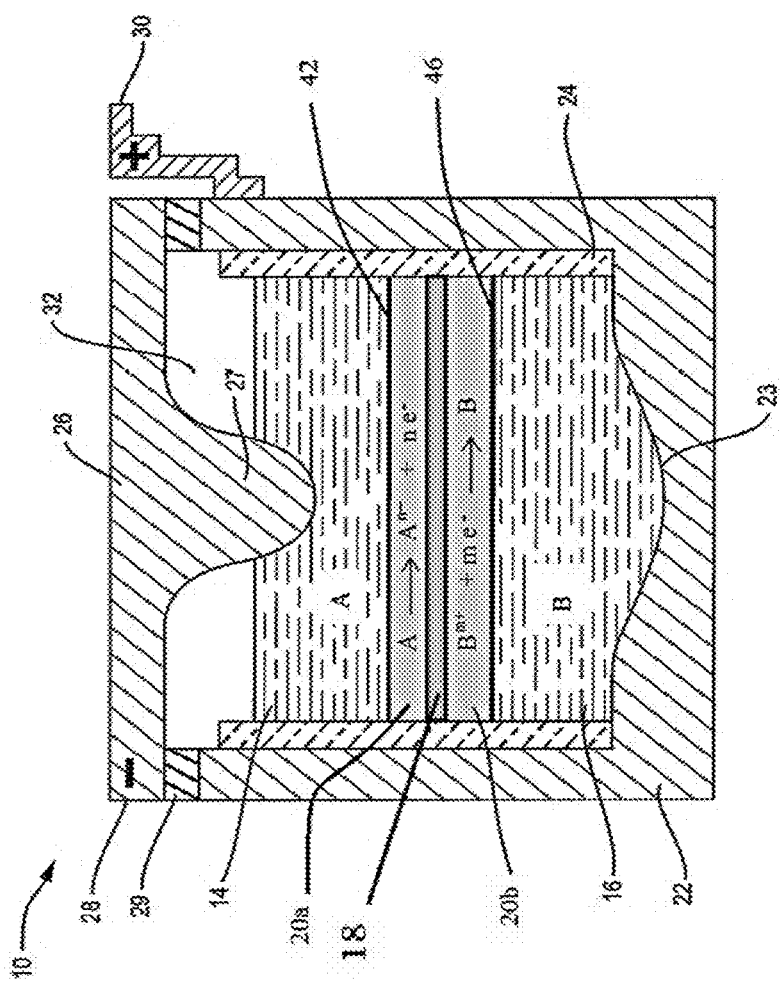
FIG. 4A is a vertical cross-sectional view illustrating the charging process of an energy storage electrochemical active metal ion cell according to an embodiment of the invention (with separator in middle of electrolyte).

Referring to FIG. 4A, in another embodiment, a metallic membrane may be used as a conductive separator 18 to selectively transport the itinerant ion and hence prevent the catholyte from coming into contact with the anode. For example, the conductive separator 18 may be fully contained within the electrolyte 20 and thus electronically insulated from both the cathode and anode and serve as a separator to allow transport of only one type of cation. An example of such a system is Li/Li salts/Pb (metallic membrane)/Li salts+Zn salts/Zn. The metallic membrane is chosen such that it is stable with respect to the catholyte.

Figure 4B:
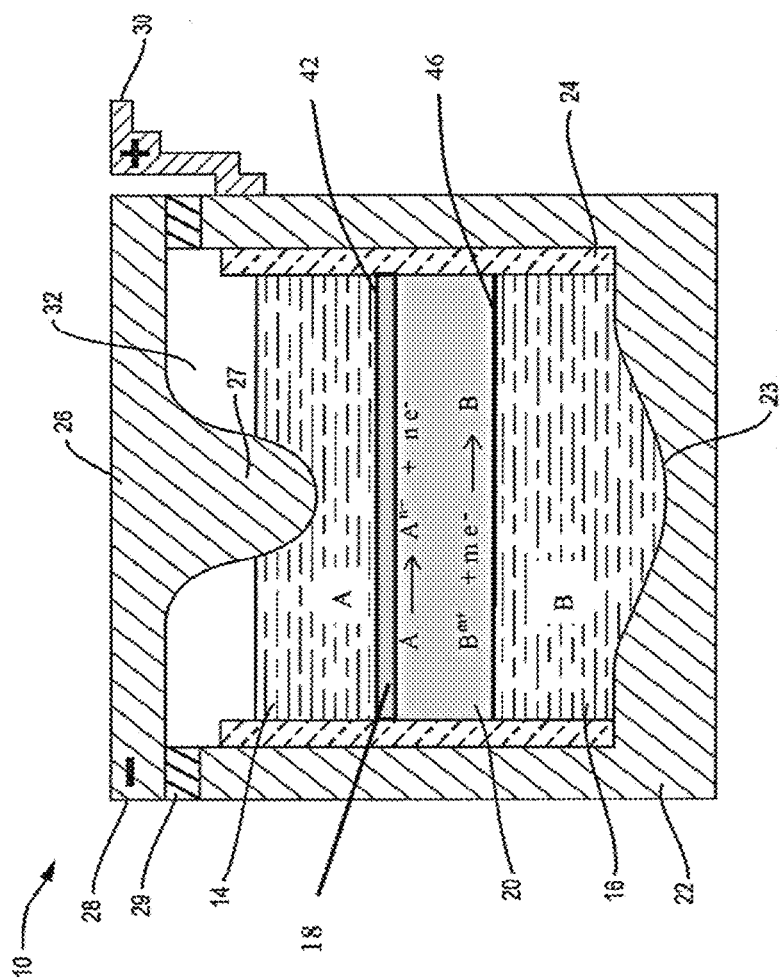
FIG. 4B is a vertical cross-sectional view illustrating the charging process of an energy storage electrochemical active metal ion cell according to an embodiment of the invention (with separator in direct contact with the anode).

Referring to FIG. 4B, in another embodiment, a selective ionic conductor may be used as a separator 18 between the two phases of the electrolyte 20a and 20b. This separator would selectively transport the anode ion or anion taking place in the displacement reaction, enhance and allow phase separation of the third phase to a phase containing the cathodic salt and a phase without the cathodic salt.

The selective ionic conductor may be used to selectively transport anode ion to and from the anode. The selected separator would be in direct contact with the anode preventing physical contact of the anode and electrolyte and only allowing anode ion active salt anion transport. The electrolyte may be allowed to form a single phase in this case.

A solid or liquid electrolyte may also be used to physically separate the first active metal (anode) from the catholyte while allowing ionic transport of the first metal or transport of the salt anion taking place in the reaction. For example, a Na$^+$ conductive beta alumina or NASICON™ may be used as an appropriate electrolyte/separator. Other alkali or alkaline earth metals may also be used with an appropriate solid ionic conductor (e.g., for Li, a LISICON™, Li beta alumina or oxide and other sulfide based glass, etc. may be used). When the temperature of operation allows (<300° C.), a polymer electrolyte may also be used.

Figure 5A:
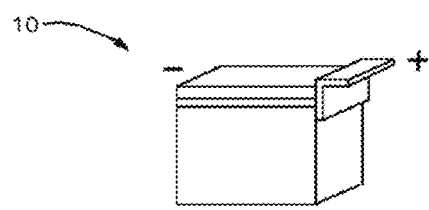
FIGS. 5A-5C are depictions of systems comprising one cell (FIG. 5A), an array of active metal ion cells connected in series (FIG. 5B), and an array of these cells connected in both series and parallel (FIG. 5C).

In some embodiments, an active metal ion cell 10 of the type shown in FIG. 1A, 1B, 4A, or 4B is used to make a battery of better usable voltage in the following way. FIG. 5A shows a perspective view the cell 10 of the configuration type shown in FIG. 1A, 1B, 4A, or 4B. The active metal ion cell 10, for example, is a cube 10 cm long on each side.

Figure 5B:
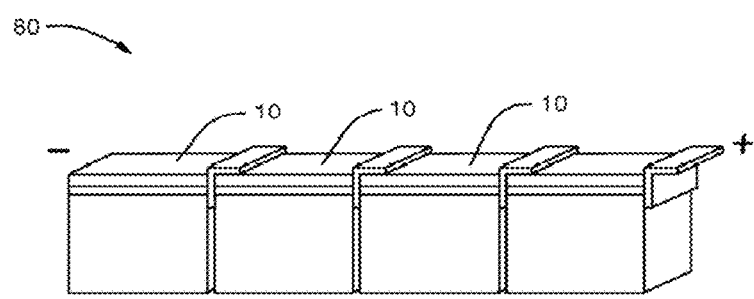
Figure 5C:
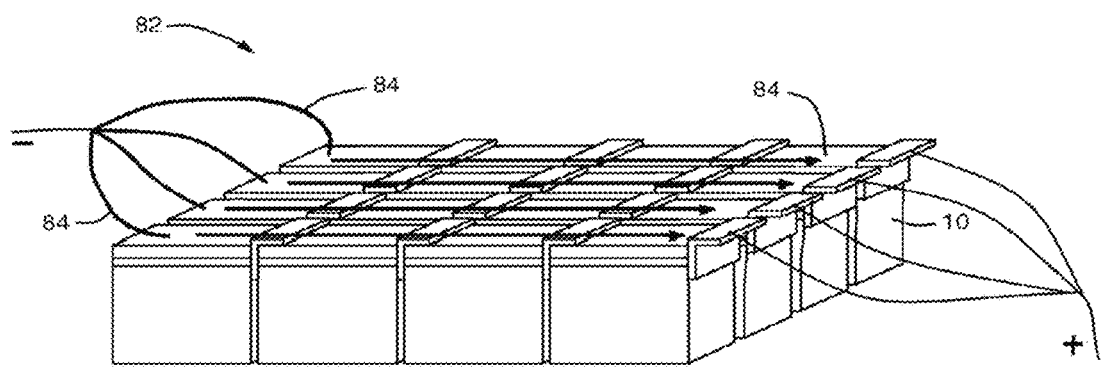

FIG. 5B shows a linear assembly 80 formed of four such cells 10 connected in series. In FIG. 5C, four linear assemblies 80 are joined to form an array 82 of 16 cells connected in series and parallel, in which the direction of electrons during charging is indicated by arrows 84. For example, an assembly having an array of four cells connected in series, each cell with 2V, assembled together with six assemblies, would produce a battery delivering 8V. Such arrays may be stacked and electrically joined, e.g., six high, into modules to create a battery having an open-circuit voltage on the order of 48 V. With a sufficient amount of cells and sufficient size, the battery may be self-heated by using inefficiencies during charge and discharge.

The active metal ion cell 10 (FIG. 1A, 1B, 4A, 4B or 5A) or battery 80 or 82 (FIGS. 5B and 5C) may be capable of rapidly receiving and dispatching electricity, thus bridging a supply-demand mismatch. The energy-storage active metal ion cells may operate at extreme temperatures, such as arctic cold and desert heat, without restriction on geographical location and are realizable in a mobile structure.

The power capacity may be large, e.g., on the order of one megawatt (MW) per ten units, and scalable for adaptation from a variety of medium scale capacity for use in residential applications to a variety of large-scale capacity in industrial and power management applications. Several approaches are possible in expanding the capacity of the active metal ion energy-storage cell to adapt it to the requirements of large-scale applications, on the order of several megawatts. In one approach, scalability may be exploited in a single large active metal ion energy-storage cell by increasing the mass of the electrodes 14 and 16 and corresponding electrolyte 20 and thus, increasing the mass of active materials available for transfer within the cell. In another approach, a battery, including many smaller active metal ion cells connected in series, may confer a higher battery voltage more practically integrated with the power electrics necessary to serve large-scale systems. In yet another approach, an array of cells may be interconnected in series and parallel connections for increased robustness with respect to failure due to individual cell malfunction.

One potential use for the active metal ion energy-storage cell is at a large-scale power generator. The diurnal fluctuation in energy demand reduces plant efficiency, consequently increasing emissions by preventing generator operation at optimum output levels around the clock. A high-capacity electrical energy storage apparatus, with a power capacity greater than 1 MW, could allow load-leveling, which is effected by downloading power from the generator to a storage device during low-demand periods, and then uploading power to the grid during times of higher demand, permitting the power plant to operate at a more constant level—with fewer power spikes.

A second potential use for the active metal ion energy-storage cell is at renewable energy source converters. Variability in supply makes management of power generated by renewable sources challenging. Sources such as wind and solar energy generate only intermittently. Without adequate power storage, additional power generators are needed on standby to operate in the event that the wind stops blowing, or the sky clouds over. The underutilized capital in the form of excess power generators ultimately may limit the scale of deployment of renewable energy sources. A reliable, high-capacity electrical storage device, used in conjunction with a renewable energy source, should provide dedicated load leveling, thus supporting implementation of renewable energy sources on the grid. Such a combination should also support the use of intermittent renewable energy sources as an alternative to generators in remote, off-grid locations, e.g., locations where periodic delivery of fuel may be difficult.

A third potential use for the active metal ion energy-storage cell is in support of transmission lines. Transmission and distribution systems generally have no storage capacity. The grid therefore must meet instantaneous demand. As the load on a transmission line approaches its capacity, it incurs heavy ohmic losses, which decrease its efficiency. Furthermore, the resulting resistive heating can melt system components and cause transmission line failure. Portable generators of the requisite power capacity (tens of MW) available to boost supply at the load center may be noisy, polluting, and require periodic refueling. Upgrading or replacing transmission lines as they reach capacity limits is very expensive, time consuming, and frequently meets with public opposition.

A mobile active metal ion energy storage unit located near a load center could supply a portion of the energy carried by the transmission line during peak hours of the day, thus mitigating load demands on the line. Ideally, the storage unit would provide a significant portion, for example, at least 2% to 20% of the line's capacity, which is typically on the order of 500 MW. Such a unit could defer the need for a transmission line upgrade.

Alternatively, a portable active metal ion energy storage unit could be deployed to supply emergency power after a system failure, or to maintain power delivery during construction of new lines. The storage unit then can be relocated when no longer needed.

Distribution systems from load centers suffer similar problems, although at much lower loads, and could similarly be addressed using a portable power storage unit. Commercial and residential consumers requiring a constant supply of electricity are especially vulnerable to blackouts. Auxiliary generators are less than ideal for backup because they require time to reach full output levels. These consumers would benefit from backup power systems, or uninterruptible power systems ("UPS"), configured to provide continuity in electricity in the event of a grid-power failure. A charged active metal ion energy storage unit, configured to discharge when the power is interrupted, could meet that need. Finally, a facility that is sensitive to voltage irregularities can be adversely affected by brownouts or other inconsistencies in delivered power. A UPS in the form of a charged metal ion energy storage unit, configured to discharge to eliminate deviations from the desired power level, could act as a buffer between the grid and the facility to ensure high power quality.

Many large-scale implementations are expected to have a capacity of greater than about 30 kWh. An active metal ion energy-storage cell of capacity lower than 30 kWh may be implemented at a small commercial or residential level, where an energy source, such as solar panels or individual wind turbines, may be used to charge the cell. Such a system should provide a continuous source of electricity to sustain the energy needs of the commercial or residential facility. These types of systems may be used advantageously in remote locations, off the grid, where the import of electricity with power lines is exorbitant or not practicable. Of course, such systems may be used in various other environments, such as in an urban or suburban environment where a household could self consume power generated by a rooftop photovoltaic array by managing local power production and demand with the proposed device.

Active metal ion energy-storage cells thus may achieve high capability while using low-cost, abundant metal. Selection of the first and second active metals, and electrolyte in various combinations discussed herein, permits a self-assembling cell and enables low-cost manufacturing.

EXAMPLES

Example 1

Figure 6:
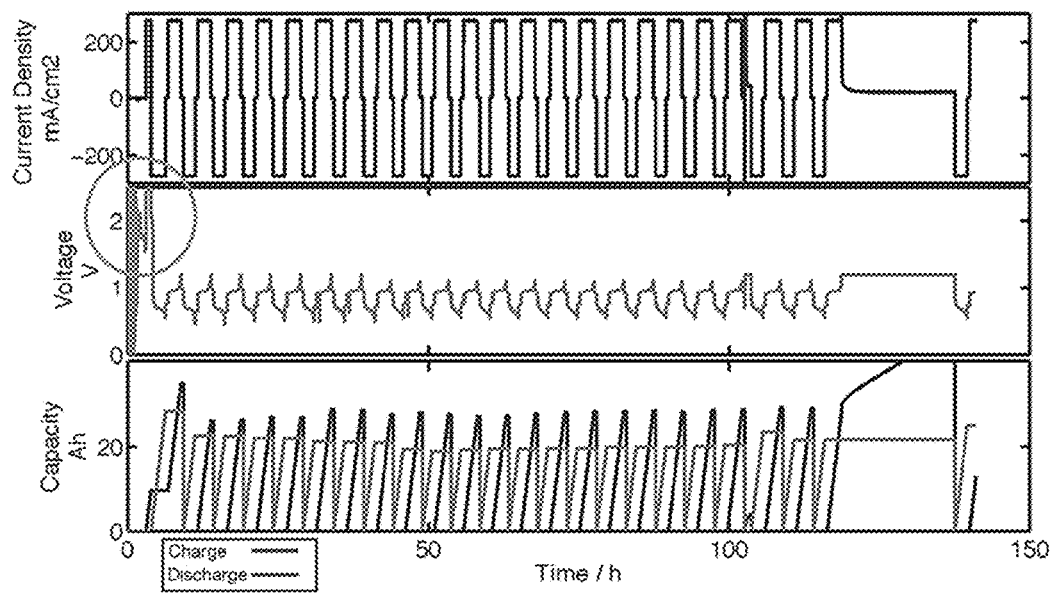
FIG. 6 is a graph of current density, voltage, and capacity over time while cycling charge and discharge of an alloying/de-alloying Li|Li-salts|Li—Pb—Sb cell at a nominal 20 Ah. The circled region on the left of the graph shows when the cell is operated in a mode according to an embodiment of the invention. The remaining portion of the graph displays the cell operated in lower voltage alloying-dealloying mode.
Figure 7:
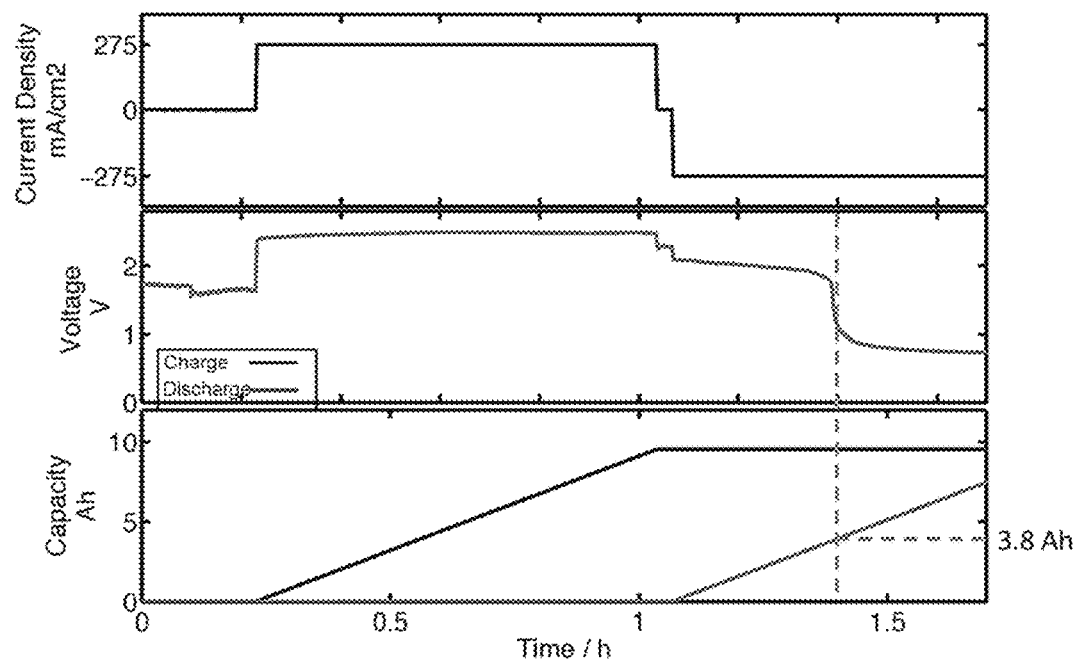
FIG. 7 is a graph of the circled region of FIG. 6.

An active metal ion cell was assembled with a Li anode, a LiCl—LiF—LiBr molten salt electrolyte and a Pb—Sb cathode and was operated at 500° C. The cell was forced to charge at 275 mA/cm² while no upper voltage limit was imposed. The resulting behavior is shown in the circled region in FIG. 6 and depicted in detail in FIG. 7. It can be seen that the cell was initially charged at a voltage plateau of 2.48 V (9.5 Ah). The cell subsequently rested in the charged state and equilibrated at a resting potential of 2.28 V. Upon discharge at 275 mA/cm², an average discharge voltage of 2V (3.8 Ah) was recorded. In FIG. 7, two particular observations can be made: i) 9.5 Ah of capacity was charged at 2.48V; and ii) 3.8 Ah of capacity was subsequently discharged at ~2V. Therefore, an unexpected second mechanism, the displacement salt reaction described herein, enables the cell's charge and discharge at a much higher potential of ~2V.

At a sufficiently high value of applied voltage, it is believed that a current flows due to the decomposition of the molten salt electrolyte (e.g., electrolysis). For the case of Li-halides, this decomposition potential is of the order of >3V (e.g., 3.6 V for $2LiCl \rightarrow 2Li+Cl_2$ (gas)). However as described herein, before electrolyte decomposition, a displacement reaction enables the Li salt electrolyte to react with the metal cathode to form a catholyte or cathodic salt at ~2V. For example, the cathode metal candidates may include Pb and/or Sb from the cathode and Fe, Cr, Mn, and/or Ni from the cathode container, e.g., a stainless steel 304 container. Using Pb as an example, one can calculate the Gibbs free energy of reaction and deduce the corresponding cell voltage of such displacement reaction ($V=\Delta G/nF$; where n is the number of electrons involved in the reaction and F the faraday constant). In the following example, a cell potential of ~2.3V is expected as Li is displaced from LiCl by Pb to form $PbCl_2$ salt (during charge):

$2LiCl+Pb \rightarrow 2Li+PbCl_2$ ~2.3V (at 500° C.)

As the cell is discharged, the reverse reaction takes place (Pb is displaced from $PbCl_2$ by Li to regenerate Pb in the cathode while LiCl is regenerated in the electrolyte). Upon charging, the chemical energy supplied forms the least favorable $PbCl_2$ salt.

Example 2

Figure 8:
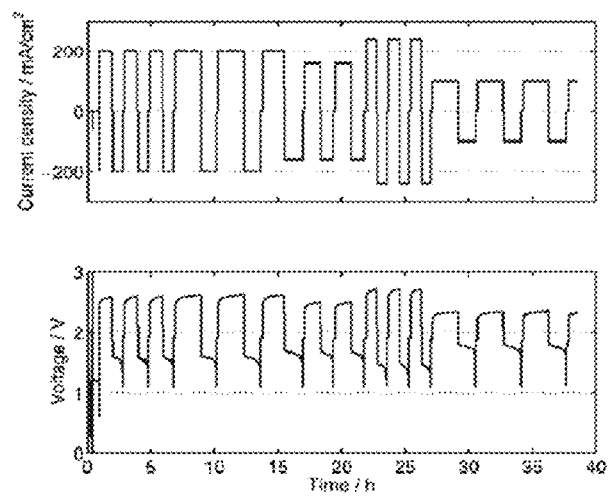
FIG. 8 is a graph of current and voltage cycling profiles over time of a Li/LiBr—$PbBr_2$/Pb displacement salt cell at various current densities when cell is operated in a mode according to an embodiment of the invention.
Figure 9:
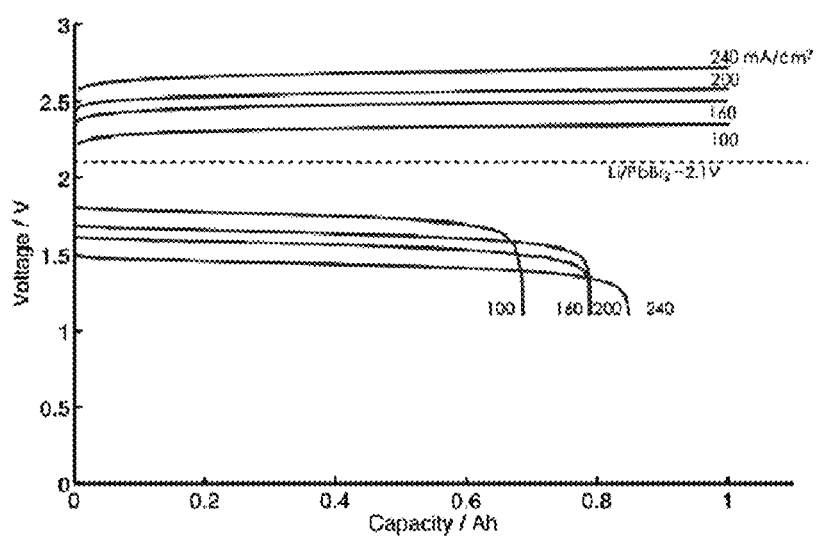
FIG. 9 is a graph of charge (upper lines) and discharge (lower lines) voltage profile v. capacity of a Li|LiBr—$PbBr_2$|Pb displacement salt cell at various current densities when cell is operated in a mode according to an embodiment of the invention.

An active metal ion cell was assembled with a Li anode, a LiBr molten salt electrolyte and a Pb cathode and was operated at 600° C.°. The cell was charged and discharged at various current densities ranging from 100 mA/cm² to 240 mA/cm². In FIGS. 8 and 9 the corresponding charging and discharge voltage profiles are displayed. As demonstrated, the displacement reaction of LiBr by $Pb^{2+}$ enables an equilibrium cell voltage of 2.1V whereas the corresponding Li/Pb alloying/dealloying cell would lead to a mere 0.6V system. As shown, the device has high current density capability and at the state of optimization reaches an 86% coulombic efficiency.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An electrochemical cell comprising:
   a negative electrode comprising lithium as a first active metal;
   a positive electrode, separated from the negative electrode, comprising lead as a second active metal; and
   an electrolyte, between the negative electrode and the positive electrode, comprising a salt of the first active metal and a salt of the second active metal, the electrolyte defining first and second interfaces, the negative electrode being in contact with the electrolyte at the first interface and the positive electrode being in contact with the electrolyte at the second interface, wherein the salts of the first and second active metals are selected from the group consisting of a halide, a sulfate, a carbonate, a nitrate, and combinations thereof,
   wherein
   at least two of the group consisting of the negative electrode, the positive electrode, and the electrolyte are in the molten state at an operating temperature of the cell,
   the electrolyte composition varies such that in a charging mode, the salt of the first active metal decreases while the salt of the second active metal increases, and in a discharging mode, the salt of the first active metal increases while the salt of the second active metal decreases, and
   in a charging mode the first active metal is reduced and the second active metal is oxidized, and in a discharging mode the first active metal is oxidized and the second active metal is reduced.

2. The electrochemical cell according to claim 1, wherein the positive electrode further comprises an element selected from the group consisting of nickel, iron, copper, zinc, bismuth, tin, aluminum, cadmium, mercury, antimony, and combinations thereof.

3. The electrochemical cell according to claim 1, wherein the positive electrode comprises an alloy having 20 mole % lead in bismuth.

4. The electrochemical cell according to claim 1, wherein the salt of the first active metal is LiCl and wherein the salt of the second active metal is $PbCl_2$.

5. The electrochemical cell according to claim 1, wherein the salt of the first active metal is LiBr and wherein the salt of the second active metal is $PbBr_2$.

6. The electrochemical cell according to claim 1, wherein the halide is selected from the group consisting of chloride, bromide, iodide, and combinations thereof.

7. The electrochemical cell according to claim 1, wherein the electrolyte further comprises a salt of a non-active metal.

8. The electrochemical cell according to claim 7, wherein the non-active metal is potassium.

9. The electrochemical cell according to claim 1, wherein the negative electrode, the positive electrode, and the electrolyte have a melting temperature independently selected from 700° C. or below.

10. The electrochemical cell according to claim 1, wherein the negative electrode, the positive electrode, and the electrolyte have a melting temperature independently selected from 200° C. to 300° C.

11. The electrochemical cell according to claim 1, wherein the negative electrode, the positive electrode, and the electrolyte are in the molten state at the operating temperature of the cell.

12. The electrochemical cell according to claim 1, further comprising a container having inner walls coated with a polymer, wherein the negative electrode, the positive electrode, and the electrolyte are disposed within the container.

13. The electrochemical cell according to claim 12, wherein the polymer is poly(oxyethylene) methacrylate-g-poly(dimethyl siloxane).

14. A method of exchanging electrical energy with an external circuit, the method comprising:
providing an electrochemical cell according to claim 1;
connecting the electrochemical cell to an external circuit; and
operating the external circuit so as to drive transfer of the first active metal between the negative electrode and the electrolyte, and to drive the transfer of the second active metal between the electrolyte and the positive electrode.

15. The method according to claim 14, wherein the external circuit drives the first active metal from the negative electrode to the electrolyte and drives the second active metal from the electrolyte to the positive electrode thereby discharging the electrochemical cell.

16. The method according to claim 14, wherein the external circuit comprises a load, a power transmission line, an electric power plant, or combinations thereof.

17. The method according to claim 16, wherein the electric power plant harnesses electricity from the sun, wind, a river, a tide, heat, or combinations thereof.

18. The method according to claim 14, wherein the negative electrode, the positive electrode, and the electrolyte have a melting temperature independently selected from 200° C. to 300° C.

19. The method according to claim 14, wherein the electrochemical cell is operated at a temperature of 500° C. or below.

20. The method according to claim 14, wherein the electrolyte further comprises a salt of a non-active metal.

21. The method according to claim 20, wherein the non-active metal is potassium.

22. The electrochemical cell according to claim 1, further comprising a selective ion conductive separator disposed between and in contact with the negative electrode and the positive electrode.

23. The electrochemical cell according to claim 1, wherein the electrolyte comprises:
an anolyte comprising the salt of the first active metal, the negative electrode being in contact with the anolyte at the first interface;
a catholyte comprising the salt of the second active metal, the positive electrode being in contact with the catholyte at the second interface; and
a selective ion conductive separator disposed between, and in contact with, the anolyte and the catholyte, wherein the anolyte and catholyte compositions vary such that in a charging mode, the salt of the first active metal decreases while the salt of the second active metal increases, and in a discharging mode, the salt of the first active metal increases while the salt of the second active metal decreases.

24. An electrochemical cell comprising:
a negative electrode comprising lithium as a first active metal;
a positive electrode, separated from the negative electrode, comprising iron as a second active metal; and
an electrolyte, between the negative electrode and the positive electrode, comprising a salt of the first active metal and a salt of the second active metal, the electrolyte defining first and second interfaces, the negative electrode being in contact with the electrolyte at the first interface and the positive electrode being in contact with the electrolyte at the second interface, wherein the salts of the first and second active metals are selected from the group consisting of a halide, a sulfate, a carbonate, a nitrate, and combinations thereof,
wherein
at least two of the group consisting of the negative electrode, the positive electrode, and the electrolyte are in the molten state at an operating temperature of the cell,
the electrolyte composition varies such that in a charging mode, the salt of the first active metal decreases while the salt of the second active metal increases, and in a discharging mode, the salt of the first active metal increases while the salt of the second active metal decreases, and
in a charging mode the first active metal is reduced and the second active metal is oxidized, and in a discharging mode the first active metal is oxidized and the second active metal is reduced.

25. The electrochemical cell according to claim 24, wherein the positive electrode further comprises an element selected from the group consisting of nickel, copper, lead, zinc, bismuth, tin, aluminum, cadmium, mercury, antimony, and combinations thereof.

26. The electrochemical cell according to claim 24, wherein the salt of the first active metal is LiCl and wherein the salt of the second active metal is $FeCl_2$ electrolyte.

27. The electrochemical cell according to claim 24, wherein the halide is selected from the group consisting of chloride, bromide, iodide, and combinations thereof.

28. The electrochemical cell according to claim 24, wherein the electrolyte further comprises a salt of a non-active metal.

29. The electrochemical cell according to claim 28, wherein the non-active metal is potassium.

30. The electrochemical cell according to claim 24, wherein the negative electrode, the positive electrode, and the electrolyte have a melting temperature independently selected from 700° C. or below.

31. The electrochemical cell according to claim 24, wherein the negative electrode, the positive electrode, and the electrolyte have a melting temperature independently selected from 200° C. to 500° C.

32. The electrochemical cell according to claim 24, wherein the negative electrode, the positive electrode, and the electrolyte are in the molten state at the operating temperature of the cell.

33. The electrochemical cell according to claim 24, further comprising a container having inner walls coated with a polymer, wherein the negative electrode, the positive electrode, and the electrolyte are disposed within the container.

34. The electrochemical cell according to claim 33, wherein the polymer is poly(oxyethylene) methacrylate-g-poly(dimethyl siloxane).

35. The electrochemical cell according to claim 24, further comprising a selective ion conductive separator disposed between and in contact with the negative electrode and the positive electrode.

36. The electrochemical cell according to claim 24, wherein the electrolyte comprises:
   an anolyte comprising the salt of the first active metal, the negative electrode being in contact with the anolyte at the first interface;
   a catholyte comprising the salt of the second active metal, the positive electrode being in contact with the catholyte at the second interface; and
   a selective ion conductive separator disposed between, and in contact with, the anolyte and the catholyte, wherein the anolyte and catholyte compositions vary such that in a charging mode, the salt of the first active metal decreases while the salt of the second active metal increases, and in a discharging mode, the salt of the first active metal increases while the salt of the second active metal decreases.

37. A method of exchanging electrical energy with an external circuit, the method comprising:
   providing an electrochemical cell according to claim 24;
   connecting the electrochemical cell to an external circuit; and
   operating the external circuit so as to drive transfer of the first active metal between the negative electrode and the electrolyte, and to drive the transfer of the second active metal between the electrolyte and the positive electrode.

38. The method according to claim 37, wherein the external circuit drives the first active metal from the negative electrode to the electrolyte and drives the second active metal from the electrolyte to the positive electrode thereby discharging the electrochemical cell.

39. The method according to claim 37, wherein the external circuit comprises a load, a power transmission line, an electric power plant, or combinations thereof.

40. The method according to claim 39, wherein the electric power plant harnesses electricity from the sun, wind, a river, a tide, heat, or combinations thereof.

41. The method according to claim 37, wherein the negative electrode, the positive electrode, and the electrolyte have a melting temperature independently selected from 200° C. to 300° C.

42. The method according to claim 37, wherein the electrochemical cell is operated at a temperature of 500° C. or below.

43. The method according to claim 37, wherein the electrolyte further comprises a salt of a non-active metal.

44. The method according to claim 43, wherein the non-active metal is potassium.

* * * * *